United States Patent [19]
Katoh et al.

[11] Patent Number: 5,200,727
[45] Date of Patent: Apr. 6, 1993

[54] FORCE GENERATING APPARATUS

[75] Inventors: Mitsuru Katoh; Shinichi Kawada; Michio Fukano; Takeshi Hojo, all of Tokyo, Japan

[73] Assignee: Tokimec Inc., Tokyo, Japan

[21] Appl. No.: 767,142

[22] Filed: Sep. 27, 1991

[30] Foreign Application Priority Data

Oct. 11, 1990 [JP] Japan .................................. 2-272891

[51] Int. Cl.5 ............................ H01F 7/08; H01F 5/00
[52] U.S. Cl. .................................... 335/222; 335/220; 335/230; 335/266
[58] Field of Search ............... 335/222, 223, 229, 230, 335/266, 204, 256, 220

[56] References Cited
U.S. PATENT DOCUMENTS 4,951,023 8/1990 Erd et al. ............................ 335/222

*Primary Examiner*—Harold Broome
*Attorney, Agent, or Firm*—Bauer & Schaffer

[57] ABSTRACT

A force generating apparatus having spacings through which magnetic fluxes are traveled, a magnetic circuit including two permanent magnets supplying magnetic fluxes to the spacings and a conductor disposed in the direction perpendicular to the magnetic fluxes in the spacings is comprised of two pair of permanent magnets of the same size, and a member for disposing the two pair of permanent magnets such that magnetic axes thereof are opposed in parallel to each other, wherein a total sum of magnetic moments caused by the two pair of permanent magnets is cancelled out. Therefore, the force generating apparatus can be prevented from producing a harmful torque even if an external magnetic field acts thereon.

3 Claims, 6 Drawing Sheets

$\phi_1 = \phi_2$

FORCE GENERATING APPARATUS

BACKGROUND OF THE INVENTION

1. Field of the Invention

The present invention generally relates to force generating apparatus and, more particularly, is directed to a force generating apparatus such as a torquer or the like which is for use with a gyro apparatus such as a gyro compass and so on.

2. Description of the Prior Art

Figure 1A:
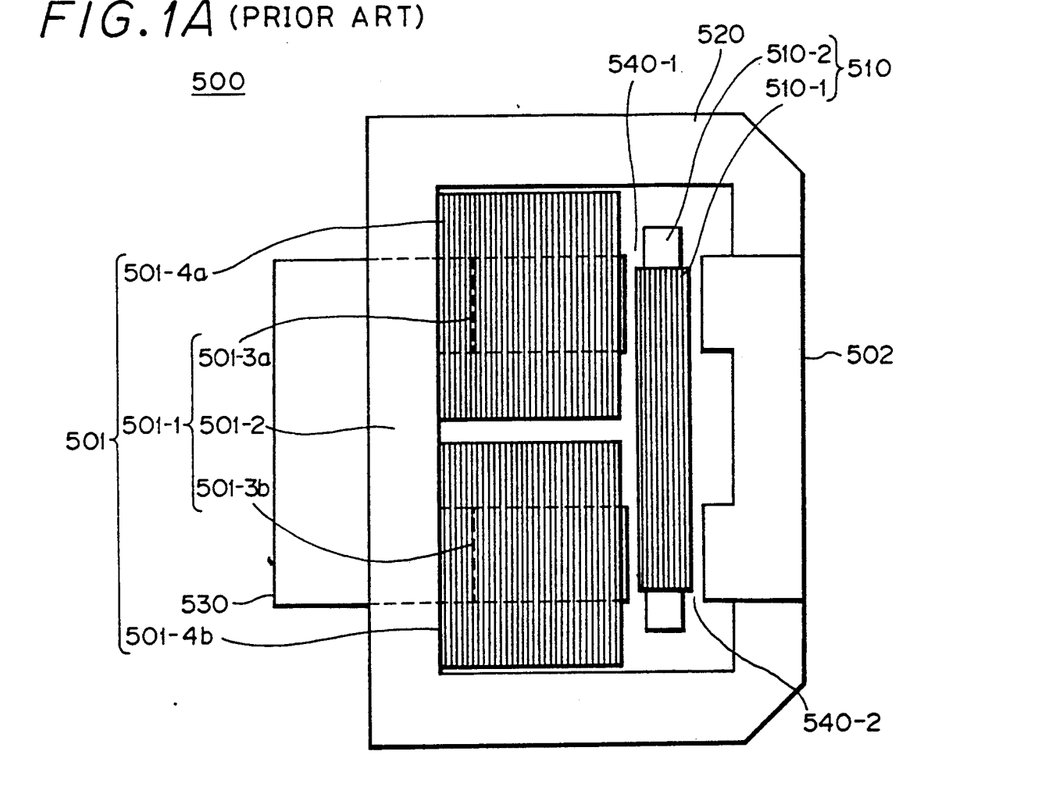
FIG. 1A is a plan view of a force generating apparatus according to the prior art.
Figure 1B:
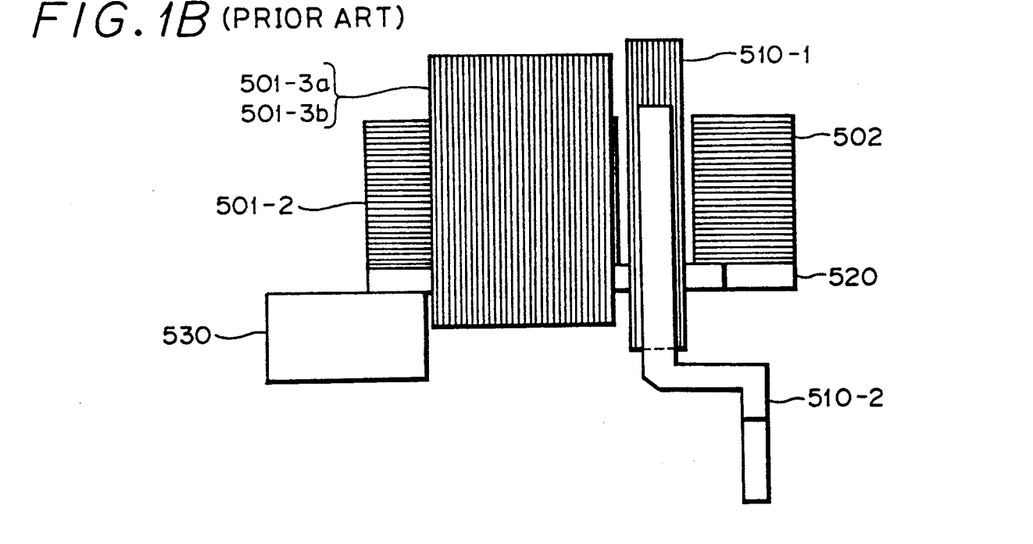
FIG. 1B is a side view thereof.
Figure 1C:
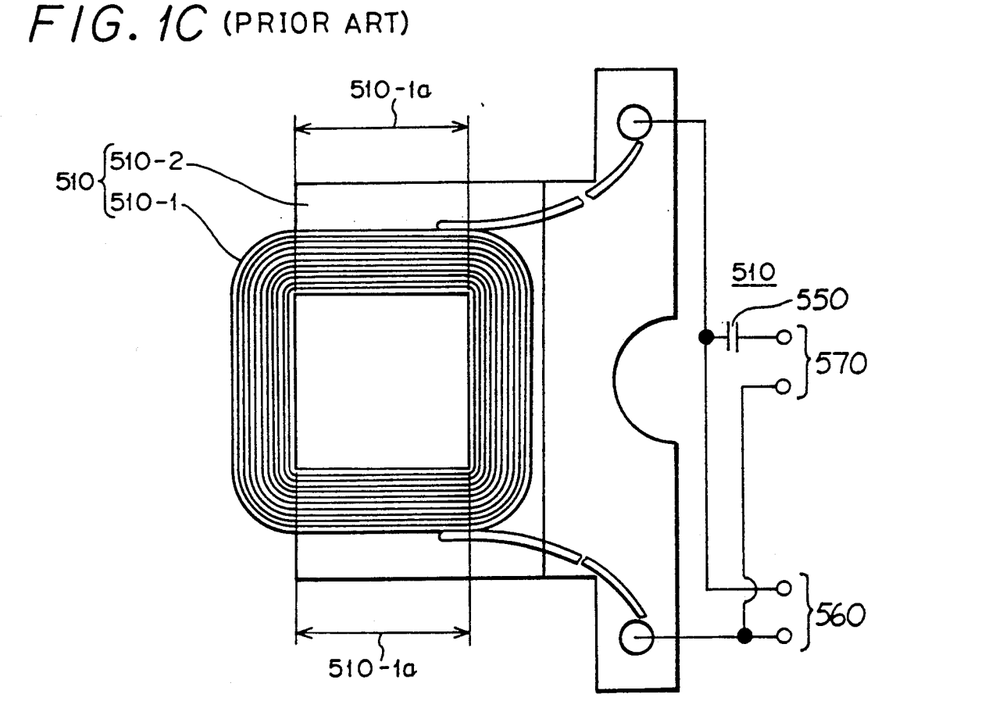
FIG. 1C is a front view of a movable member used in the force generating apparatus of FIGS. 1A and 1B.

A conventional force generating apparatus of the above-mentioned kind will be described with reference to FIGS. 1A through 1D. FIG. 1A shows a plan view of the above-mentioned force generating apparatus according to the prior art, FIG. 1B shows a side view thereof, FIG. 1C shows a front view of a movable member used in this force generating apparatus, and FIG. 1D shows a structure of a magnet assembly member also used in this force generating apparatus.

Referring to FIG. 1A, a stator 500 will be described initially. As illustrated, an iron core 501-2 of U-letter configuration is formed by laminating plate-shaped magnetic materials, and permanent magnets 501-3a, 501-3b are attached to the iron core 501-2 in the polarity such that magnetic fluxes produced by these permanent magnets 501-3a, 501-3b are communicated therethrough to form a permanent magnet assembly member 501-1. An excitation unit assembly component 501 is formed by winding excitation coils 501-4a, 501-4b around the above permanent magnet assembly member 501-1. The stator 500 is formed by fastening the excitation unit assembly component 501 and an iron core 502 of U-letter configuration made of the same material and size of those of the iron core 501-2 on a supporting member 520 by screws (not shown) such that the iron core 501-2 of U-letter configuration and the iron core 502 are opposed at their protruded portion end faces to each other with constant spacings 540-1, 540-2. Further, a mount 530 is attached to the supporting member 520. A movable member 510 is composed of a conductor 510-1 of an open square configuration (hereinafter referred to as a force coil) and a bracket 510-2 which supports the force coil 510-1.

When this force generating apparatus is applied, for example, to the gyro compass in actual practice, the stator 500 is attached to a first member (e.g., gyro case or the like) to which the force of the force generating apparatus is applied, and the movable member 510 is attached to a second member which is a supporting device for supporting the first member such that the first member becomes rotatable in a certain range. At that time, portions 510-1a, 510-1b (see FIG. 1C) forming one part of the force coil 510-1 are respectively located substantially at the center of the spacings 540-1, 540-2 formed in the stator 500, whereby the stator 500 and the movable member 510 can be constantly kept in the non-contact state against a necessary relative displacement.

Figure 1D:
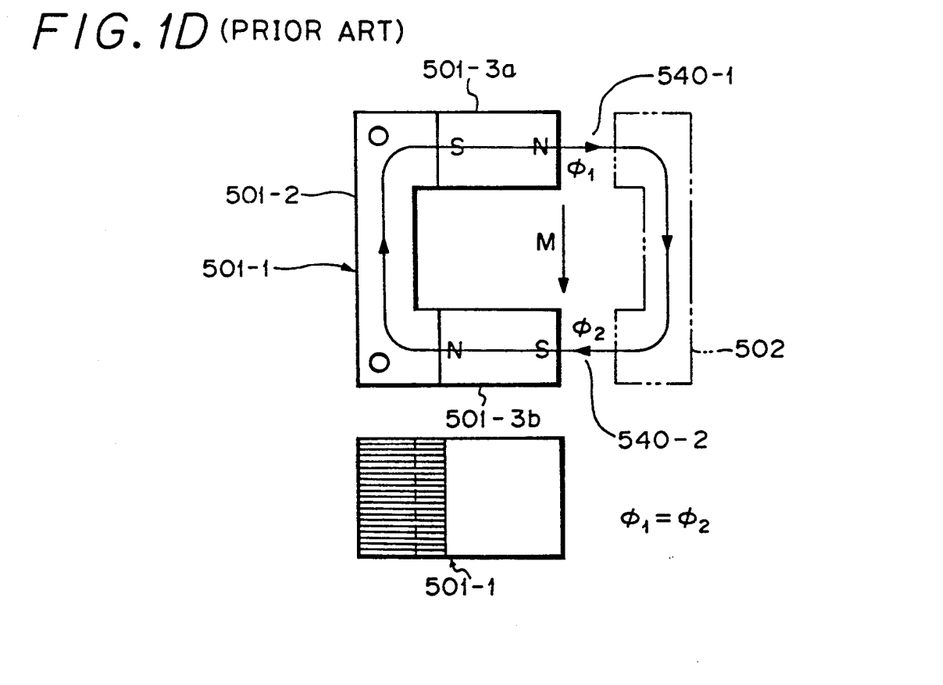
FIG. 1D is a schematic diagram showing a structure of a magnet assembly member of the conventional force generating apparatus.

Magnetic fluxes $\phi_1$, $\phi_2$ ($\phi_1 = \phi_2$) are respectively produced in the spacings 540-1 and 540-2 by the permanent magnets 501-3a, 501-3b (see FIG. 1D). If now a current i is flowed to the force coil 510-1, then a force is produced between the movable member 510 and the stator 500 due to Fleming's left-hand rule.

As shown in FIG. 1, the excitation coils 501-4a, 501-4b are adapted to superimpose AC magnetic fluxes to those generated by the permanent magnets 501-3a, 501-3b in the spacings 540-1, 540-2 so that the force generating apparatus is rendered a pickup function. This pickup function of the force generating apparatus is not directly related to the present invention and therefore need not be described. At that time, the conductor 510-1 serves also as a pickup coil in addition to the force coil.

However, according to the above-mentioned conventional force generating apparatus, a total sum of magnetic moments caused by the permanent magnets is not cancelled out as zero so that, when an external magnetic field is applied to this force generating apparatus, then the force generating apparatus generates a torque equal to geometric product of the whole magnetic moments of the magnet assembly member, intensity of external magnetic field and cosine of an angle formed by magnetic axes of the respective permanent magnets and the external magnetic field. This torque is a harmful torque which is irrelevant to the torque generated by the current flowed to the force coil.

As, for example, shown in FIG. 1D, the magnet assembly member 501-1 forms a magnet of a horseshoe configuration on the whole. As a result, the magnet assembly member 501-1 has a magnetic moment whose magnetic axis is extended in the direction shown by an arrow M in FIG. 1D on the whole. Further, as the whole of the stator 500, the magnetic moment is slightly reduced due to the existence of the U-letter shaped iron core 502 as compared with the case such that the U-letter shaped iron core 502 is not provided. However, due to the existence of the spacings 540-1, 540-2, the above magnetic moment cannot be cancelled out as zero. There is then the disadvantage that the conventional force generating apparatus is caused to generate the above harmful torque by the external magnetic field applied thereto.

OBJECTS AND SUMMARY OF THE INVENTION

Accordingly, it is an object of the present invention to provide an improved force generating apparatus in which the aforementioned shortcomings and disadvantages encountered with the prior art cam be eliminated.

More specifically, it is an object of the present invention to provide a force generating apparatus which can be prevented from producing a harmful torque even by the application of an external magnetic field.

Another object of the present invention is to provide a force generating apparatus which can be prevented from causing a north-seeking error even by the application of an external magnetic field when employed as a vertical torquer for a gyro compass.

Still another object of the present invention is to provide a force generating apparatus in which an attracting force between permanent magnets and a magnetic member can be avoided even if the magnetic member is located near the force generating apparatus.

A further object of the present invention is to provide a force generating apparatus which can be prevented from causing a north-seeking error even if a magnetic member is disposed near the force generating apparatus.

As an aspect of the present invention, a force generating apparatus having spacings through which magnetic fluxes are traveled, a magnetic circuit including two permanent magnets supplying magnetic fluxes to the spacings and a conductor disposed in the direction perpendicular to the magnetic fluxes in the spacings is comprised of two pair of permanent magnets of the same size, and a member for disposing the two pair of permanent magnets such that magnetic axes thereof are opposed in parallel to each other, wherein a total sum of magnetic moments caused by the two pair of permanent magnets is cancelled out. Therefore, the force generating apparatus can be prevented from producing a harmful torque even if an external magnetic field acts thereon.

The above and other objects, features, advantages of the present invention will become apparent in the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENTS

Before describing the present invention, let us first explain the principle of the present invention.

In the conventional magnet assembly member 501-1, for example, shown in FIG. 1D, the whole of the magnet assembly member has a magnetic moment wherein the (M) direction is represented in the magnetic axis. According to the first embodiment of the present invention shown in FIG. 2, two magnet assembly components 101-1 and 102-1, the magnetic moments of which are equal, are disposed such that their magnetic axes are parallel to each other but opposite in direction, thereby the magnetic moments of the permanent magnet assembly member being equivalently cancelled out as a whole. Thus, it is possible to obtain the force generating apparatus which can solve the above-mentioned problems.

The present invention will now be described with reference to the drawings.

Figure 2A:
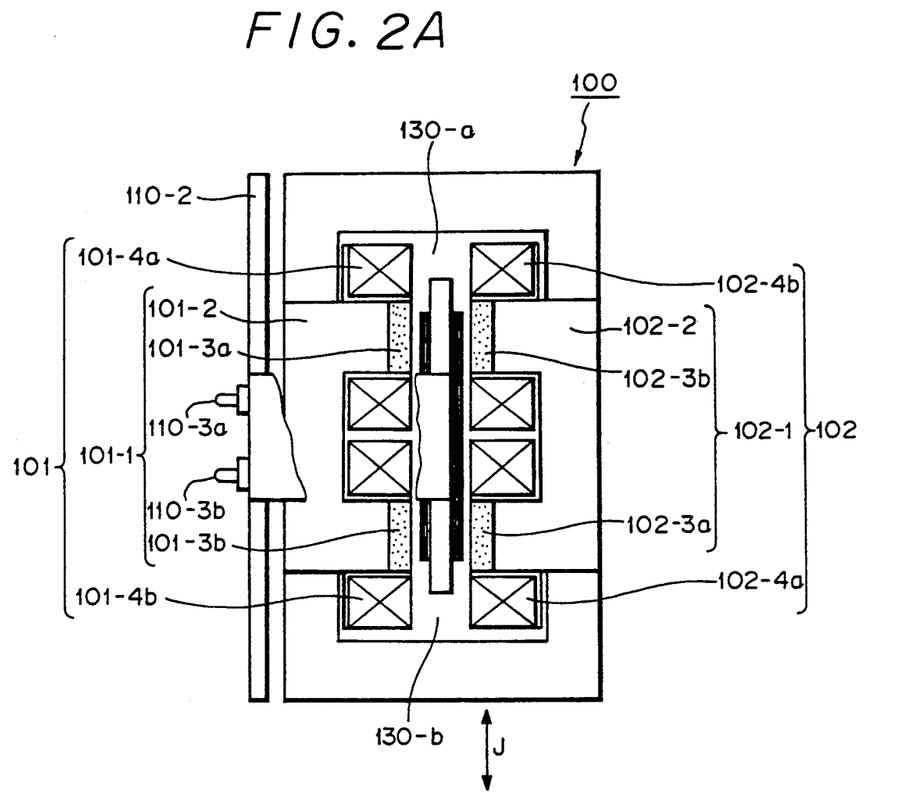
FIG. 2A is a plan view of a force generating apparatus according to a first embodiment of the present invention.
Figure 2B:
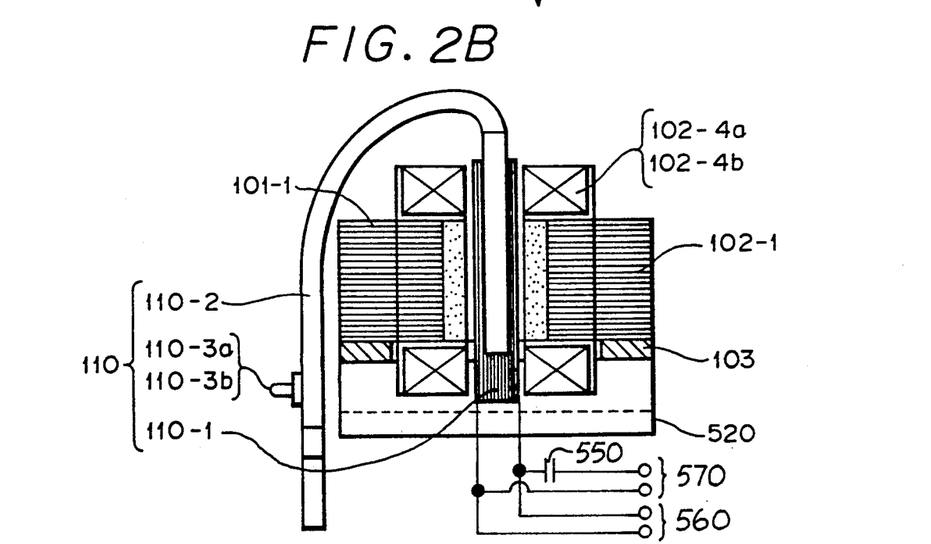
FIG. 2B is a cross-sectional side view thereof.
Figure 2C:
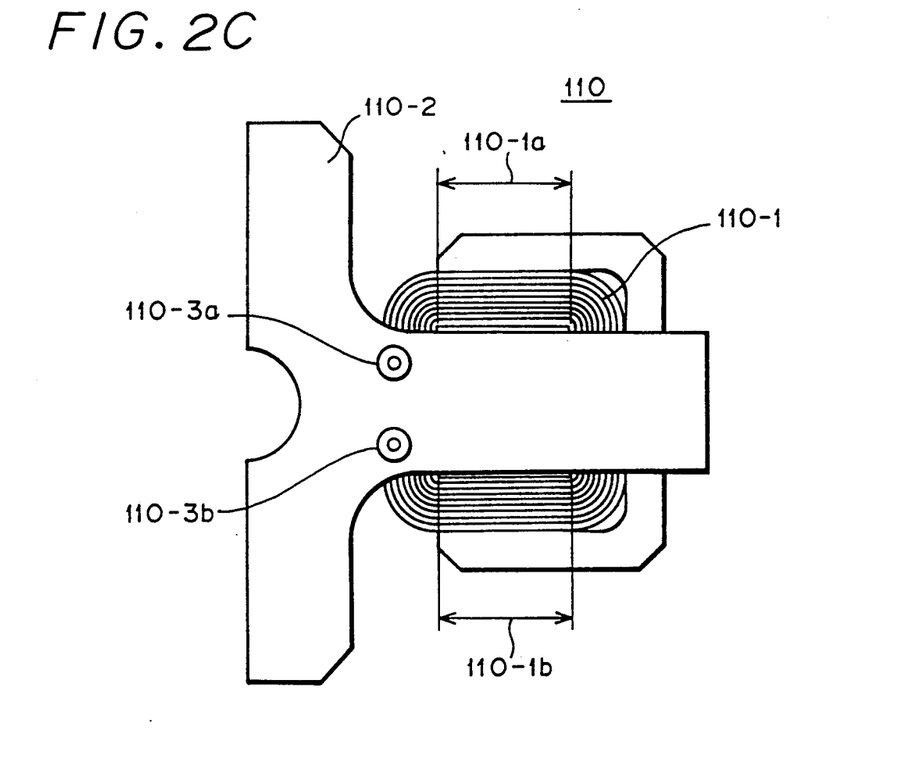
FIG. 2C is a front view of a movable member used in the force generating apparatus of the embodiment of the present invention.
Figure 2D:
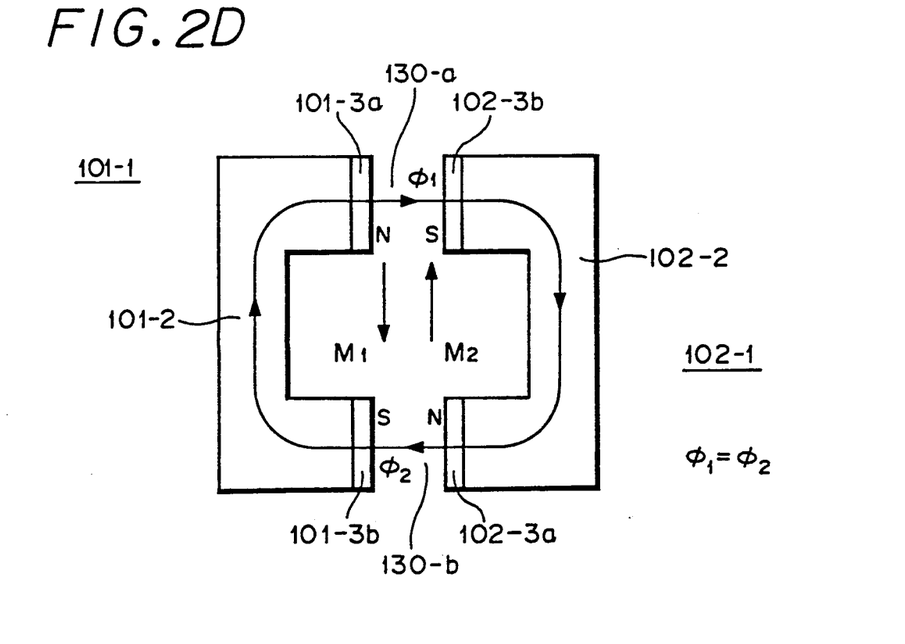
FIG. 2D is a schematic diagram showing the location of a permanent magnet assembly used in the present invention.

FIGS. 2A and 2B are a plan view and a cross-sectional side view of a first embodiment of a force generating apparatus according to the present invention, respectively, FIG. 2C is a front view of a movable member used in the first embodiment of the present invention, and FIG. 2D is a schematic diagram showing the location of a permanent magnet assembly used in the embodiment of the present invention.

The arrangement of the first embodiment of the present invention will be described first.

As illustrated in FIGS. 2A and 2B, a stator 101 is formed such that excitation unit assembly members 101, 102 which are equal in size and configuration are attached to a supporting member 103 so as to oppose to each other with constant spacings 130-a and 130-b therebetween. The excitation unit assembly member 101 is formed of an iron core 101-2 of U-letter configuration which is formed by laminating plate-shaped magnetic material, permanent magnets 101-3a, 101-3b of the same size respectively attached to the ends of two leg portions of the iron core 101-2, and excitation coils 101-4a, 101-4b wound around a magnet assembly unit 101-1 formed of iron core 101-2 and permanent magnets 101-3a, 101-3b. The magnetic pole surfaces of the magnet assembly unit 101-1 are selected such that, when one magnetic surface is N pole, the other magnetic pole surface is S pole. The other excitation unit assembly member 102 has exactly the same elements as those of the excitation unit assembly member 101 and therefore depicted by reference numerals but need not be described. Also, the magnetic pole surfaces of the respective magnets 102-3a, 102-3b of magnetic assembly unit 102-1 of excitation unit assembly member 102, which opposes through the spacings 130-a, 130-b to the magnetic pole surfaces of magnets 101-3b, 101-3a are different from each other (see FIG. 2D).

Magnetic fluxes $\phi_1$, $\phi_2$ ($\phi_1=\phi_2$) produced by the magnets 101-3a, 101-3b, 102-3a, 102-3b are traveled through the spacings 130-a, 130-b. Excitation coils 101-4a, 101-4b, 102-4a, 102-4b are adapted to superimpose AC magnetic fluxes upon the magnetic fluxes $\phi_1$, $\phi_2$ spacings 130-a, 130-b formed on the opposing magnetic pole surfaces of the magnet assembly units 101-1, 102-1. These excitation coils 101-4a, 101-4b, 102-4a, 102-4b are connected in such polarity that magnetic fluxes induced when the current is flowed to these excitation coils 101-4a, 101-4b, 102-4a, 102-4b are communicated through these excitation coils 101-4a, 101-4b, 102-4a, 102-4b. Incidentally, the above AC magnetic fluxes are used to present a pickup function similarly to the example of the prior art and is not directly related to the present invention, which therefore need not be described herein.

A movable member 110 is composed of a conductor 110-1, a bracket 110-2 for supporting the conductor 110-1 and terminals 110-3a, 110-3b led out from the conductor 110-1.

When this force generating device is mounted on the necessary apparatus in actual practice, the stator 100 is mounted on a first member (e.g., gyro case or the like) to which the force of the force generating apparatus of the present invention is applied, and the movable member 110 is mounted on a second member which is a supporting apparatus for supporting the above first member so as to become rotatable in a certain necessary range. At that time, portions 110-1a, 110-1b (see FIG. 2C) forming one part of the conductor 110-1 are located substantially at the centers of the spacings 130-a, 130b formed in the stator 100, whereby the stator 100 and the movable member 110 are constantly rendered in the non-contact state against the relative displacement of the necessary range.

If now a current i is flowed to the conductor 110-1, then a force in the direction shown by an arrow J in FIG. 2A occurs between the movable member 110 and the stator 100 due to Fleming's left-hand rule so that the force can be applied to the first member to which the stator 100 is attached. Naturally, this force acts about a rotary shaft of the first member as a torque.

As described above, according to the first embodiment of the present invention, since the magnet assembly members 101-1 and 102-1 having the equal magnetic moment are disposed such that the magnetic axes thereof become in parallel to each other but opposite in direction, a magnetic axis M1 traveling from the permanent magnet 101-3a to the permanent magnet 101-3b and a magnetic axis M2 traveling from the other permanent magnet 102-3a to the permanent magnet 102-3b are produced, thereby the magnetic moments being equivalently cancelled out on the whole. Therefore, even if the external magnetic field acts on the force generating apparatus of the present invention, this apparatus can be prevented from generating a harmful torque unlike the prior art.

Further, in this embodiment, the configurations of the U-letter shaped iron cores 101-2, 102-2 used in the magnet assembly members 101-1, 102-1 are determined because the excitation coils 101-4a, 101-4b, 102-4a, 102-4b must be mounted on the magnet assembly member 101-1, 102-1. In this case, the configurations of the iron cores 101-2, 102-2 are not limited to the above U-letter shapes and may be rod shapes. Further, if the force generating apparatus is merely the torquer which does not need the pickup function, then the iron cores 101-2, 102-2 need not be formed by laminating the plate-shaped magnetic materials and may formed by solid magnetic materials.

Figure 3A:
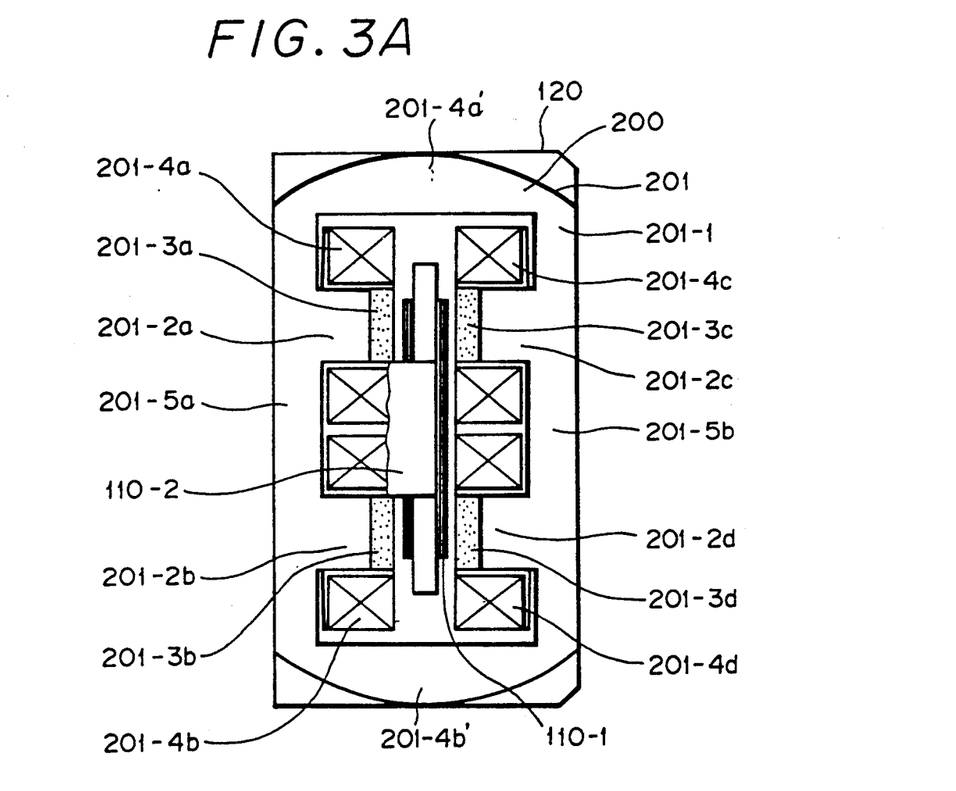
FIG. 3A is a plan view of a second embodiment of the force generating apparatus according to the present invention.
Figure 3B:
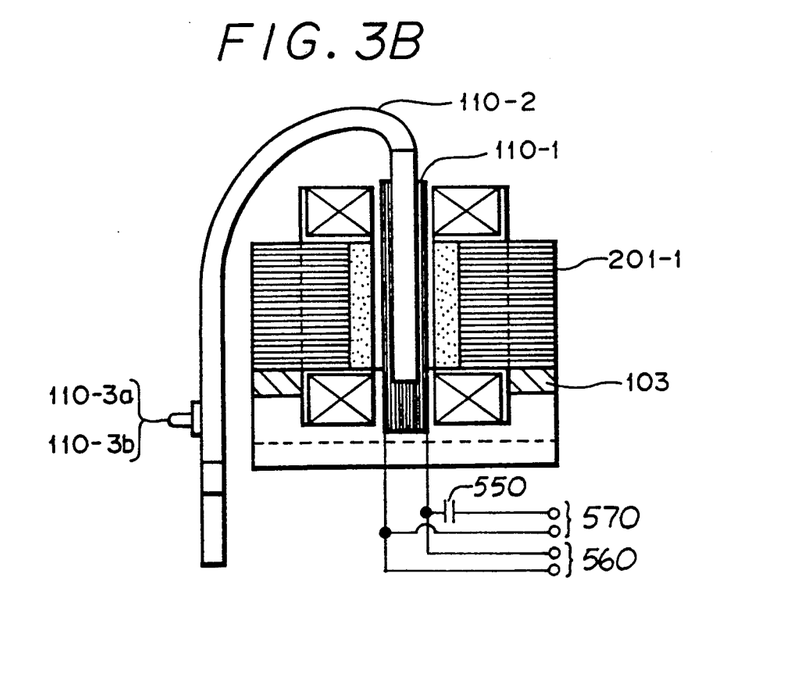
FIG. 3B is a cross-sectional side view thereof.
Figure 3C:
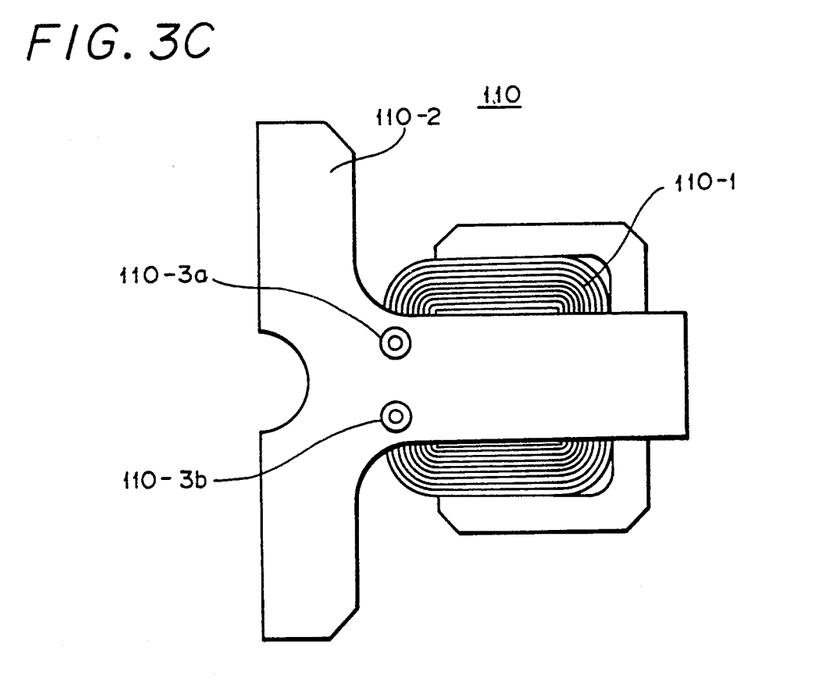
FIG. 3C is a front view of the movable member used in the force generating apparatus according to another embodiment of the present invention.
Figure 3D:
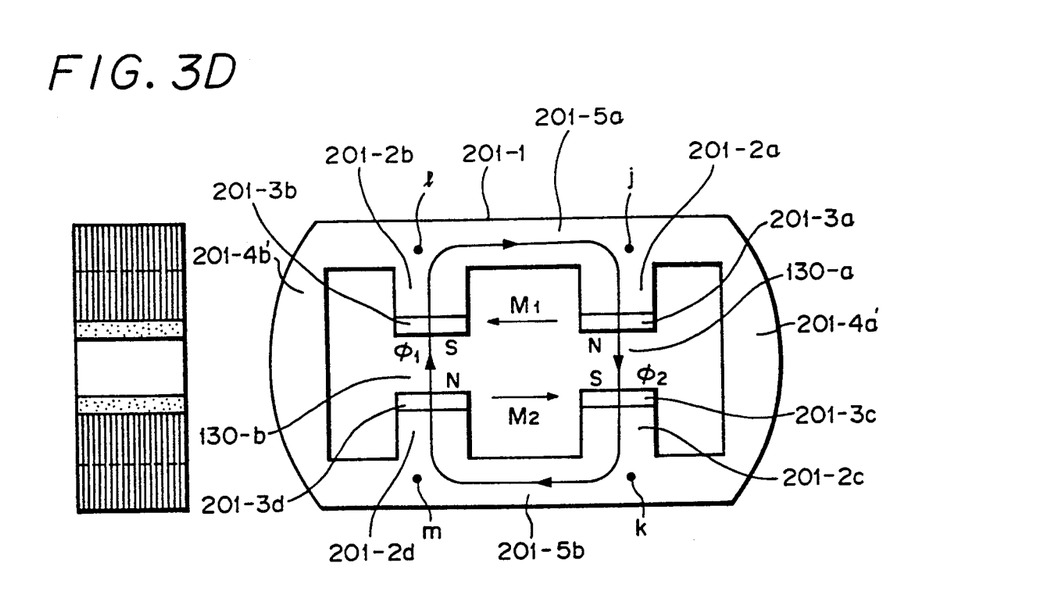
FIG. 3D is a schematic diagram showing a structure of a magnet assembly used in the second embodiment of the present invention.

A second embodiment of the force generating apparatus according to the present invention will be described with reference to FIGS. 3A through 3D. FIG. 3A is a plan view of this embodiment, FIG. 3B is a cross-sectional side view thereof, FIG. 3C is a front view illustrating the entirety of a movable member 110 used in this embodiment, and FIG. 3D is a front view illustrating a magnet assembly member 201 used in the present invention. As clear from these figures, according to this embodiment, the two magnet assembly members 101-1, 102-1 in the first embodiment of FIG. 2 are unitarily formed as the magnet assembly member 201 but the movable member 110 is substantially the same as that used in the first embodiment. Thus, in FIGS. 3A to 3D, like references corresponding to those in FIGS. 2A to 2D designate the same or similar elements and hence their description will be omitted.

In the second embodiment, as shown in FIGS. 3A to 3D, permanent magnets 201-3a, 201-3b, 201-3c, 201-3d of the same size are attached to an iron core 201-1 formed by laminating the plate-shaped magnetic materials in polarity such that magnetic fluxes generated by these permanent magnets 201-3a, 201-3b, 201-3c and 201-3d pass through these permanent magnets 201-3a, 201-3b, 201-3c and 201-3d. According to the above-mentioned arrangement of the permanent magnets 201-3a, 201-3b, 201-3c and 201-3d, assuming that $M_1$ is a magnetic moment of one part of a magnet assembly member formed by the permanent magnet 201-3a, a protruded portion 201-2a of an iron core 201-1 to which the magnet 201-3c is attached, a magnetic path 201-5a of iron core 201-1, a protruded portion 201-2b of iron core 201-1 to which the permanent magnet 201-3b is attached and the permanent magnet 2013b and that $M_2$ is a magnetic moment of one part of a magnet assembly member formed by the permanent magnet 201-3c, a protruded portion 201-2c of an iron core 201-1 to which the magnet 201-3c is attached, a magnetic path 201-5b of iron core 201-1, a protruded portion 201-2d of iron core 201-1 to which the permanent magnet 201-3d is attached and the permanent magnet 201-3d, then the magnetic moments $M_1$ and $M_2$ are the same in magnitude, parallel to each other and opposite in direction (in other words, the magnetic axes thereof are parallel to each other but opposite in direction). Therefore, according to the second embodiment of the present invention, even if an external magnetic field acts thereon, the force generating apparatus of the present invention can be prevented from producing a harmful torque unlike the example of the prior art.

In the second embodiment of FIG. 3, the inside protruded portions 201-2a, 201-2b, 201-2c and 201-2d are provided on the iron core 201-1 because excitation coils 201-4a, 201-4b, 201-4c, 201-4d must be mounted on the magnet assembly member 201 and hence, they are not necessarily needed. Further, if the force generating apparatus of this embodiment is not required to have a pickup function, then these excitation coils 201-4a, 201-4b, 201-4c, 201-4d are not required and the iron core 201-1 is not limited to the laminated layer of the plate-shaped magnetic materials and may be formed by a solid magnetic material.

Furthermore, in this embodiment, since the iron core 201-1 of the stator 200 is formed as one body, the lengths of the spacings 130-a, 130-b can be controlled well and the number of plate-shaped magnetic material laminated layers forming the iron core 201-1 can be reduced.

In addition, portions 201-4a', 201-4b' forming one part of the iron core 201-1 act to shield magnetic fluxes leaked from the permanent magnets 201-3a, 201-3b, 201-3c and 201-3d as, for example, shown in FIG. 3D so that, even when an iron-based member is located near the force generating apparatus, an attracting force acting between the above-mentioned iron-based member and the permanent magnets 201-3a, 201-3b, 201-3c, 201-3d can be reduced considerably.

Since magnetic potential difference between portions j, k and between portions l, m of the iron core 201-1 shown in FIG. 3D are low, magnetic fluxes generated from the permanent magnets 201-3a, . . . , 201-3d do not substantially pass through the portions 201-4a' and 201-4b' forming one part of the above iron core 201-1.

As set out above, according to the present invention, the following effects can be achieved:

In the force generating apparatus according to the present invention, since the total sum of magnetic moments caused by the permanent magnets is cancelled out or made zero, the force generating apparatus of the present invention can be prevented from producing a harmful torque regardless of the application of the external magnetic field. Accordingly, if the force generating apparatus of the present invention is employed as a vertical torquer for the gyro compass, then north-seeking error can be prevented from being caused by this force generating apparatus regardless of the action of the external magnetic field such as geomagnetism or the like.

Furthermore, in the second embodiment shown in FIG. 3, since the magnetic fluxes leaked from the permanent magnets are shielded by the portions 201-4a' and 201-4b' forming one part of the iron core 201-1, regardless of the magnetic member located near the force generating apparatus, the attracting force between the permanent magnets forming the force generating apparatus and the magnetic member can be avoided. Therefore, even if the magnetic member is located in the proximity of the force generating apparatus, then the force generating apparatus of this embodiment can be prevented from causing a north-seeking error when applied to the gyro compass.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A pickup torquer for use with a gyro apparatus comprising:
    a rectangular frame formed by laminating a number of plates made of magnetic material and having first and second pairs of leg portions which project inwardly from the inner surfaces of longer opposing sides of said rectangular frame at same positions with spacings between facing ends of said first and second pairs of leg portions;
    a first pair of permanent magnets attached to free ends of said first pair of leg portions;
    a second pair of permanent magnets attached to free ends of said second pair of leg portions;
    a first pair of primary coils wound around said first pair of leg portions;
    a second pair of primary coils wound around said second pair of leg portions; and
    a secondary coil located in said spacings in noncontact fashion with said first and second pairs of permanent magnets, wherein magnetic fluxes generated by said permanent magnets travels through a magnetic circuit formed by said permanent magnets, said leg portions and said spacings so that said secondary coil intersects said magnetic fluxes, said first and second pairs of primary sails being excited by an AC current.

2. A pickup torquer as claimed in claim 1, wherein said rectangular frame is mounted on a first member, while said secondary coil is mounted on a second member.

3. A pickup torquer as claimed in claim 2, wherein said first member is a gyro case and said second member is a supporting apparatus for supporting said gyro case.

* * * * *

UNITED STATES PATENT AND TRADEMARK OFFICE
CERTIFICATE OF CORRECTION

PATENT NO. : 5,200,727
DATED : April 6, 1993
INVENTOR(S) : Mitsuru Katoh, et. al.

It is certified that error appears in the above-indentified patent and that said Letters Patent is hereby corrected as shown below:

Column 8, line 19, replace "sails" with --coils--.

Signed and Sealed this

Twenty-second Day of February, 1994

Attest:

BRUCE LEHMAN

Attesting Officer     Commissioner of Patents and Trademarks